US007719216B2

(12) United States Patent
Sato et al.

(10) Patent No.: US 7,719,216 B2
(45) Date of Patent: May 18, 2010

(54) MOTOR DRIVE CONTROL DEVICE AND MOTOR DRIVE CONTROL SYSTEM

(75) Inventors: Toshiaki Sato, Kusatsu (JP); Takayuki Hatakeyama, Kusatsu (JP); Tetsuya Itagaki, Kusatsu (JP); Shunsuke Suga, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 12/442,534

(22) PCT Filed: Sep. 27, 2007

(86) PCT No.: PCT/JP2007/068880

§ 371 (c)(1),
(2), (4) Date: Mar. 24, 2009

(87) PCT Pub. No.: WO2008/038739

PCT Pub. Date: Apr. 3, 2008

(65) Prior Publication Data

US 2009/0218969 A1 Sep. 3, 2009

(30) Foreign Application Priority Data

Sep. 29, 2006 (JP) ............................. 2006-266522

(51) Int. Cl.
*H02P 6/00* (2006.01)
*H02P 1/00* (2006.01)
(52) U.S. Cl. ................. 318/400.04; 318/139; 318/280; 318/650; 417/42
(58) Field of Classification Search ................ 318/139, 318/268, 280, 283, 599, 603, 650, 400.04; 388/804, 809; 417/44.1, 42
See application file for complete search history.

(56) References Cited

U.S. PATENT DOCUMENTS

| 5,194,794 | A | * | 3/1993 | Shamoto | ..................... 318/603 |
| 6,563,284 | B2 | * | 5/2003 | Teutsch et al. | .............. 318/599 |
| 6,603,277 | B2 | * | 8/2003 | Yoshimura | .................. 318/139 |
| 6,825,632 | B2 | * | 11/2004 | Hahn et al. | .................. 318/599 |
| 6,867,682 | B2 | * | 3/2005 | Reinhardt et al. | ............ 340/3.5 |
| 6,967,459 | B2 | * | 11/2005 | Hahn et al. | .................. 318/599 |
| 6,997,684 | B2 | * | 2/2006 | Hahn et al. | ................. 417/44.1 |
| 7,058,537 | B2 | * | 6/2006 | Sutter et al. | .................. 702/150 |
| 7,106,020 | B1 | * | 9/2006 | McMillan | .............. 318/400.13 |

(Continued)

FOREIGN PATENT DOCUMENTS

JP        10-084690 A        3/1998

(Continued)

*Primary Examiner*—Paul Ip
(74) *Attorney, Agent, or Firm*—Global IP Counselors

(57) ABSTRACT

A motor drive control device for controlling the driving of a brushless motor includes position detecting units (e.g. sensors or Hall elements), a drive signal determining unit and a drive signal outputting unit (an output circuit). The position detecting units are disposed in positions apart from each other by an electric angle of 120 degrees and output position detection signals representing the position of the rotor with respect to the stator. The drive signal determining unit determines drive signals for driving the 3-phase drive coils on the basis of the position detection signals. The drive signal outputting unit generates and outputs, to the 3-phase drive coils, the drive signals that have been determined by the drive signal determining unit.

17 Claims, 12 Drawing Sheets

U.S. PATENT DOCUMENTS

| | | | |
|---|---|---|---|
| 7,444,070 B2 * | 10/2008 | Hahn et al. | 388/809 |
| 7,456,597 B2 * | 11/2008 | Kanamori | 318/599 |
| 2002/0043946 A1 * | 4/2002 | Yoshimura | 318/139 |
| 2003/0020460 A1 * | 1/2003 | Hsu et al. | 324/161 |
| 2003/0175124 A1 * | 9/2003 | Hahn et al. | 417/44.1 |
| 2004/0081438 A1 * | 4/2004 | Hahn et al. | 388/804 |
| 2004/0104695 A1 * | 6/2004 | Hahn et al. | 318/254 |
| 2005/0171724 A1 * | 8/2005 | Sutter et al. | 702/145 |
| 2006/0104822 A1 * | 5/2006 | Hahn et al. | 417/42 |
| 2006/0176005 A1 * | 8/2006 | Ta et al. | 318/650 |
| 2007/0216345 A1 * | 9/2007 | Kanamori | 318/814 |
| 2008/0018273 A1 * | 1/2008 | Kanamori | 318/268 |
| 2008/0112695 A1 * | 5/2008 | Kanamori | 388/811 |

FOREIGN PATENT DOCUMENTS

| | | |
|---|---|---|
| JP | 2003-235228 A | 8/2003 |
| JP | 3483740 B2 | 10/2003 |
| JP | 2004-201377 A | 7/2004 |
| JP | 2005-160183 A | 6/2005 |

* cited by examiner

SIGNAL DETERMINATION TABLE 1

| DRIVE SIGNAL ENERGIZATION PATTERN | U PHASE | | V PHASE | | W PHASE | |
|---|---|---|---|---|---|---|
| | Gu | Gx | Gv | Gy | Gw | Gz |
| 0 | ON | OFF | OFF | ON | OFF | OFF |
| 1 | ON | OFF | OFF | OFF | OFF | ON |
| 2 | OFF | OFF | ON | OFF | OFF | ON |
| 3 | OFF | ON | ON | OFF | OFF | OFF |
| 4 | OFF | ON | OFF | OFF | ON | OFF |
| 5 | OFF | OFF | OFF | ON | ON | OFF |

FIG. 2

SIGNAL DETERMINATION TABLE 2

| POSITION DETECTION SIGNAL | | | POSITION ESTIMATION SIGNAL | U PHASE | | V PHASE | | W PHASE | |
|---|---|---|---|---|---|---|---|---|---|
| Hu | Hv | | Hw' | Gu | Gx | Gv | Gy | Gw | Gz |
| 0 | 1 | | 0 | ON | OFF | OFF | ON | OFF | OFF |
| 0 | 1 | | 1 | ON | OFF | OFF | OFF | OFF | ON |
| 0 | 0 | | 1 | OFF | ON | ON | OFF | OFF | ON |
| 1 | 0 | | 1 | OFF | ON | ON | OFF | OFF | OFF |
| 1 | 0 | | 0 | OFF | ON | OFF | OFF | ON | OFF |
| 1 | 1 | | 0 | OFF | OFF | OFF | ON | ON | OFF |

FIG. 3

SIGNAL DETERMINATION TABLE 3

| POSITION DETECTION SIGNAL | | U PHASE | | V PHASE | | W PHASE | | DRIVE SIGNAL ENERGIZATION PATTERN |
|---|---|---|---|---|---|---|---|---|
| Hu | Hv | Gu | Gx | Gv | Gy | Gw | Gz | |
| 0 | 1 | ON | OFF | OFF | ON | OFF | OFF | 0 |
| 0 | 0 | OFF | OFF | ON | OFF | OFF | ON | 2 |
| 1 | 0 | OFF | ON | ON | OFF | OFF | OFF | 3 |
| 1 | 1 | OFF | OFF | OFF | ON | ON | OFF | 5 |

FIG. 4

MOTOR DRIVE CONTROL DEVICE AND MOTOR DRIVE CONTROL SYSTEM

CROSS-REFERENCE TO RELATED APPLICATIONS

This U.S. National stage application claims priority under 35 U.S.C. 119(a) to Japanese Patent Application No. 2006-266522, filed in Japan on Sep. 29, 2006, the entire contents of which are hereby incorporated herein by reference.

TECHNICAL FIELD

The present invention relates to a motor drive control device and particularly to a motor drive control device that controls a driving of a brushless motor that includes a stator having 3-phase drive coils and a rotor having plural magnetic poles and to a motor drive control system that uses this motor drive control device.

BACKGROUND ART

In recent years, in air conditioners disposed with devices such as a compressor and a blowing fan, a 3-phase brushless DC motor, for example, has been used as a power source of these devices.

Generally, a 3-phase brushless DC motor includes a rotor comprising a permanent magnet having plural magnetic poles and a stator having 3-phase drive coils. A current corresponding to the position of the rotor with respect to the stator is allowed to flow in the drive coils of this kind of brushless DC motor by a motor drive control device for controlling the driving of this motor. Thus, in the drive coils, a magnetic field corresponding to this current arises, and the rotor rotates.

Here, among methods of detecting the position of the rotor with respect to the stator, there is often used a method that uses three position detecting sensors disposed so as to correspond to each of the 3-phase drive coils. Examples of the position detecting sensors include Hall elements and Hall ICs. However, costs become higher when there are many of these position detecting sensors, and the size of the substrate on which the position detecting sensors are disposed ends up becoming large.

Thus, in Japanese Patent No. 3,483,740, there is disclosed a device where the number of Hall ICs that are to be used, which is ordinarily three, is made into two and these two Hall ICs are disposed such that the phases of position detection signals that the two Hall ICs detect are shifted from each other by $\pi/2$, whereby the device stably drives a motor.

SUMMARY OF THE INVENTION

Technical Problem

However, in Japanese Patent No. 3,483,740, there are the following problems.

Japanese Patent No. 3,483,740

In a universal 3-phase brushless DC motor, three Hall ICs are disposed equidistantly, that is, such that the phases of the position detection signals that each of the Hall ICs detect are shifted from each other by $2\pi/3$. However, the disposition of the Hall ICs of patent document 1 is different from that of the Hall ICs in a universal 3-phase brushless DC motor. For that reason, in Japanese Patent No. 3,483,740, a universal 3-phase brushless DC motor cannot be used.

Moreover, in Japanese Patent No. 3,483,740, it is necessary to separately produce a control component for controlling the rotation of the rotor using the position detection signals detected from each of the Hall ICs, and the algorithm of this control component ends up becoming complicated. Consequently, from the standpoint of universality, it is difficult to say that this is always the optimal method.

Thus, it is an object of the present invention to provide a motor drive control device and a motor drive control system which, even when two Hall ICs are used, can easily control the driving of a 3-phase brushless motor without separately requiring a control component having a complicated algorithm.

Solution to the Problem

A motor drive control device pertaining to a first aspect of the present invention controls the driving of a brushless motor that includes a stator having 3-phase drive coils and a rotor having plural magnetic poles. The motor drive control device comprises two position detecting units, a drive signal determining unit and a drive signal outputting unit. The two position detecting units are disposed in positions apart from each other by an electric angle of substantially 120 degrees and output position detection signals representing the position of the rotor with respect to the stator. The drive signal determining unit determines drive signals for driving the 3-phase drive coils on the basis of the position detection signals that the two position detecting units have respectively outputted. The drive signal outputting unit generates, and outputs to the 3-phase drive coils, the drive signals that have been determined by the drive signal determining unit.

According to this motor drive control device, the drive signals are determined by the detection signals of the two position detecting units and outputted to each of the drive coils. Then, current flows as a result of drive voltages at those times being applied to each of the drive coils, and the brushless motor is driven. In this manner, the motor drive control device performs drive control of the brushless motor by a configuration disposed with the two position detecting units, but the motor drive control device does not require a unique circuit or the like for drive control and can control the driving of the brushless motor using a circuit or the like for drive control in a case where the device is disposed with three position detecting units. Consequently, a reduction in costs can be realized.

A motor drive control device pertaining to a second aspect of the present invention is the motor drive control device pertaining to the first aspect of the present invention, wherein the drive signal determining unit determines the drive signals in the following manner. The drive signal determining unit determines the drive signals such that energization widths of each of the 3-phase drive coils become electric angles of substantially 120 degrees, substantially 180 degrees and substantially 60 degrees.

A motor drive control device pertaining to a third aspect of the present invention is the motor drive control device pertaining to the second aspect of the present invention, wherein the drive signal whose energization width is an electric angle of substantially 120 degrees has the same phase as an induced voltage generated in the drive coil to which this drive signal is inputted.

A motor drive control device pertaining to a fourth aspect of the present invention is the motor drive control device pertaining to the third aspect of the present invention, wherein the phases of the position detection signals are shifted by a predetermined first angle with respect to induced voltages generated in the drive coils corresponding to the position detecting units that output the position detection signals.

A motor drive control device pertaining to a fifth aspect of the present invention is the motor drive control device pertaining to the fourth aspect of the present invention, wherein the predetermined first angle is substantially 30 degrees.

A motor drive control device pertaining to a sixth aspect of the present invention is the motor drive control device pertaining to the second aspect of the present invention, wherein the drive signal whose energization width is an electric angle of substantially 180 degrees and the drive signal whose energization width is an electric angle of substantially 60 degrees have substantially the same phases as each of induced voltages generated in the drive coils to which these drive signals are respectively inputted.

Generally, a relationship such as shown in FIG. 9 is established between the phase and current amount of the current with which each of the drive coils are energized and the torque output of the motor. In particular, the torque output of the motor becomes larger the larger the current with which the drive coils are energized is. Further, when the motor drive control device is performing, in regard to the motor, PWM control to output an output voltage whose duty is constant, for example, the same relationship is established depending on the energization width. Thus, this motor drive control device ensures that each of the drive signals of 60-degree energization and 180-degree energization have the same phases as the induced voltages generated in the corresponding drive coils by adjusting the disposition of the position detecting units, for example. Thus, in 60-degree energization, which is the phase of the three phases that outputs the least torque, the phase of the current to be outputted is the same phase as the induced voltage generated in that drive coil, so the minimum value of the torque output becomes higher in comparison to the case pertaining to the third aspect of the present invention. Consequently, the fluctuation width of the torque, that is, the torque ripple, also becomes small.

A motor drive control device pertaining to a seventh aspect of the present invention is the motor drive control device pertaining to the sixth aspect of the present invention, wherein the position detection signals have substantially the same phases as induced voltages generated in the drive coils corresponding to the position detecting units that output the position detection signals.

A motor drive control device pertaining to an eighth aspect of the present invention is the motor drive control device pertaining to any of the first to seventh aspects of the present invention, wherein each of the two position detecting units have hysteresis characteristics whose thresholds for detecting the position of the rotor differ depending on the direction of rotation of the rotor. Additionally, the positions where the two position detecting units are disposed are adjusted on the basis of the hysteresis characteristics.

The position detecting units have so-called hysteresis characteristics whose thresholds that detect the position of the rotor differ depending on the direction of rotation of the rotor. For example, even when the position detecting units are disposed such that the phases of the position detection signals when the rotor has rotated in the forward direction become "0" with respect to the induced voltages generated in the drive coils corresponding to those position detecting units, the position detection signals when the rotor has rotated in the reverse direction end up being shifted by a predetermined phase with respect to the induced voltages generated in the drive coils at this time. Thus, in this motor drive control device, in consideration of the hysteresis of the position detecting units, the position detecting units are disposed such that the phases with respect to the induced voltages become the same even when, for example, the rotor has rotated in either the forward or the reverse direction. Thus, the same torque is obtained regardless of the direction of rotation of the brushless motor.

A motor drive control device pertaining to a ninth aspect of the present invention is the motor drive control device pertaining to the eighth aspect of the present invention, wherein the two position detecting units are respectively disposed such that, even when the direction of rotation of the rotor changes, the shifts in the phases of the position detection signals with respect to each of the induced voltages generated in the drive coils corresponding to each of the position detecting units become substantially the same.

Thus, substantially the same torque can be obtained more reliably regardless of the direction of rotation of the rotor.

A motor drive control device pertaining to a tenth aspect of the present invention is the motor drive control device pertaining to any of the first to ninth aspects of the present invention, wherein the position detection signals have square wave shapes, and the motor drive control device further comprises a time measuring unit. The time measuring unit starts measuring a first time at a timing when one of the two position detection signals that each of the two position detecting units detect changes. Additionally, the drive signal determining unit changes the drive signals currently being outputted when the first time has become equal to or greater than a first predetermined time.

Generally, it is difficult to accurately grasp the position of the rotor when the number of rotations is close to "0" rpm, such as at the instant when the rotor has changed from reverse rotation to forward rotation. Thus, this motor drive control device starts measuring time from the time when one of the two position detection signals changes, and changes the drive signals currently being outputted after the elapse of a predetermined time. Thus, the path of the current flowing in each of the 3-phase drive coils changes, and the electromagnetic force generated in the drive coils changes. For that reason, the rotor rotates, and the number of rotations of the rotor becomes no longer "0"rpm. Consequently, the motor drive control device becomes able to grasp the accurate position of the rotor.

A motor drive control device pertaining to an eleventh aspect of the present invention is the motor drive control device pertaining to the tenth aspect of the present invention, wherein the time measuring unit starts measuring a second time at a timing when the drive signal determining unit has changed the drive signals. Additionally, the drive signal determining unit further changes the drive signals when the second time has become equal to or greater than a second predetermined time.

Thus, the drive signals can be changed even if the position detection signals do not change.

A motor drive control device pertaining to a twelfth aspect of the present invention is the motor drive control device pertaining to any of the first to eleventh aspects of the present invention, wherein the motor drive control device further comprises a number-of-rotations measuring unit and a position estimating unit. The number-of-rotations measuring unit measures the number of rotations of the rotor. The position estimating unit estimates the position of the rotor on the basis of at least one of the position detection signals detected by each of the two position detecting units. Additionally, the drive signal determining unit changes the energization widths of the drive signals to an electric angle of a predetermined second angle on the basis of the position of the rotor that has been estimated by the position estimating unit when the rotor is rotating in a forward direction and the number of rotations is equal to or greater than a predetermined number of rotations.

In the present invention, there are two position detecting units, so sometimes the drive signals of two phases become 180-degree energization and 60-degree energization respectively as in the second aspect of the present invention, for example. When this happens, as for the output torque of the brushless motor, the torque ripple ends up becoming large, and noise and vibration end up becoming large, in comparison to when all three phases perform 120-degree energization. Thus, this motor drive control device switches all three of the drive signals to substantially 120-degree energization when the brushless motor is rotating in the forward direction and the number of rotations of the brushless motor has become equal to or greater than a predetermined number of rotations. Thus, the torque ripple is controlled, and noise and vibration can be controlled.

A motor drive control device pertaining to a thirteenth aspect of the present invention is the motor drive control device pertaining to the twelfth aspect of the present invention, wherein the predetermined second angle is substantially 120 degrees.

A motor drive control device pertaining to a fourteenth aspect of the present invention is the motor drive control device pertaining to the twelfth aspect or the thirteenth aspect of the present invention, further comprising a direction-of-rotation detecting unit. The direction-of-rotation detecting unit detects the direction of rotation of the rotor.

In this manner, the motor drive control device further comprises the direction-of-rotation detecting unit, so the present invention can be applied even to a motor where the rotor ends up reversely rotating due to the affect of wind or the like from the outside.

A motor drive control device pertaining to a fifteenth aspect of the present invention is the motor drive control device pertaining to any of the first to fourteenth aspects of the present invention, wherein the brushless motor is a fan-use motor.

In this manner, the present invention can achieve those effects even in a fan-use motor that is sometimes driven from a reverse rotation state.

A motor drive control device pertaining to a sixteenth aspect of the present invention is the motor drive control device pertaining to any of the first to fourteenth aspects of the present invention, wherein the brushless motor is an outdoor unit fan motor of an air conditioner.

In this manner, the present invention can achieve those effects even in an outdoor unit fan motor of an air conditioner that is sometimes driven from a reverse rotation state.

Further, a motor drive control system pertaining to a seventeenth aspect of the present invention comprises a brushless motor and a motor drive control device. The brushless motor includes a stator having 3-phase drive coils and a rotor having plural magnetic poles. The motor drive control device is the motor drive control device pertaining to any of the first to sixteenth aspects of the present invention for driving the brushless motor.

Thus, the same effects as the first to sixteenth aspects of the present invention can be achieved.

ADVANTAGEOUS EFFECTS OF THE INVENTION

The motor drive control device according to the first to fifth aspects of the invention performs control of the driving of the brushless motor by a configuration disposed with the two position detecting units, but the motor drive control device does not require a unique circuit or the like for drive control having a complicated algorithm and can control the driving of the brushless motor using a circuit or the like for drive control in a case where the device is disposed with three position detecting units. Consequently, a reduction in costs can be realized.

According to the motor drive control device according to the sixth and seventh aspects of the invention, in 60-degree energization, which is the phase of the three phases that outputs the least torque, the phase of the current to be outputted is the same phase as the induced voltage generated in that drive coil, so the minimum value of the torque output becomes higher in comparison to the case according to the third aspect of the present invention. Thus, the fluctuation width of the torque, that is, the torque ripple, can be made small.

According to the motor drive control device according to the eighth and ninth aspects of the invention, the same torque is obtained regardless of the direction of rotation of the brushless motor.

According to the motor drive control device pertaining to the tenth aspect of the invention, the motor drive control device becomes able to grasp the accurate position of the rotor.

According to the motor drive control device pertaining to the eleventh aspect of the invention, the drive signals can be changed even if the position detection signals do not change.

According to the motor drive control device pertaining to the twelfth and thirteenth aspects of the invention, the torque ripple is controlled, and noise and vibration can be controlled.

According to the motor drive control device pertaining to the fourteenth aspect of the invention, the present invention can be applied even to a motor where the rotor ends up reversely rotating due to the affect of wind or the like from the outside.

According to the motor drive control device pertaining to the fifteenth and sixteenth aspects of the invention, the present invention can achieve those effects even in a fan-use motor or an outdoor unit fan motor of an air conditioner that is sometimes driven from a reverse rotation state.

According to the motor drive control system pertaining to the seventeenth aspect of the invention, the same effects as the first to sixteenth aspects of the present invention can be achieved.

BRIEF DESCRIPTION OF THE DRAWINGS

FIG. 2 is a conceptual diagram of a signal determination table 1 that a drive signal determining unit uses when the number of rotations of a rotor is in the vicinity of "0" rpm.

FIG. 3 is a conceptual diagram of a signal determination table 2 that the drive signal determining unit uses when a position estimating unit has estimated the position of the rotor.

FIG. 4 is a conceptual diagram of a signal determination table 3 that the drive signal determining unit uses when the number of rotations of the rotor is equal to or greater than "0" rpm and less than a predetermined number of rotations.

DETAILED DESCRIPTION OF THE INVENTION

Embodiment (1) Entirety and Configuration of Motor

Figure 1:
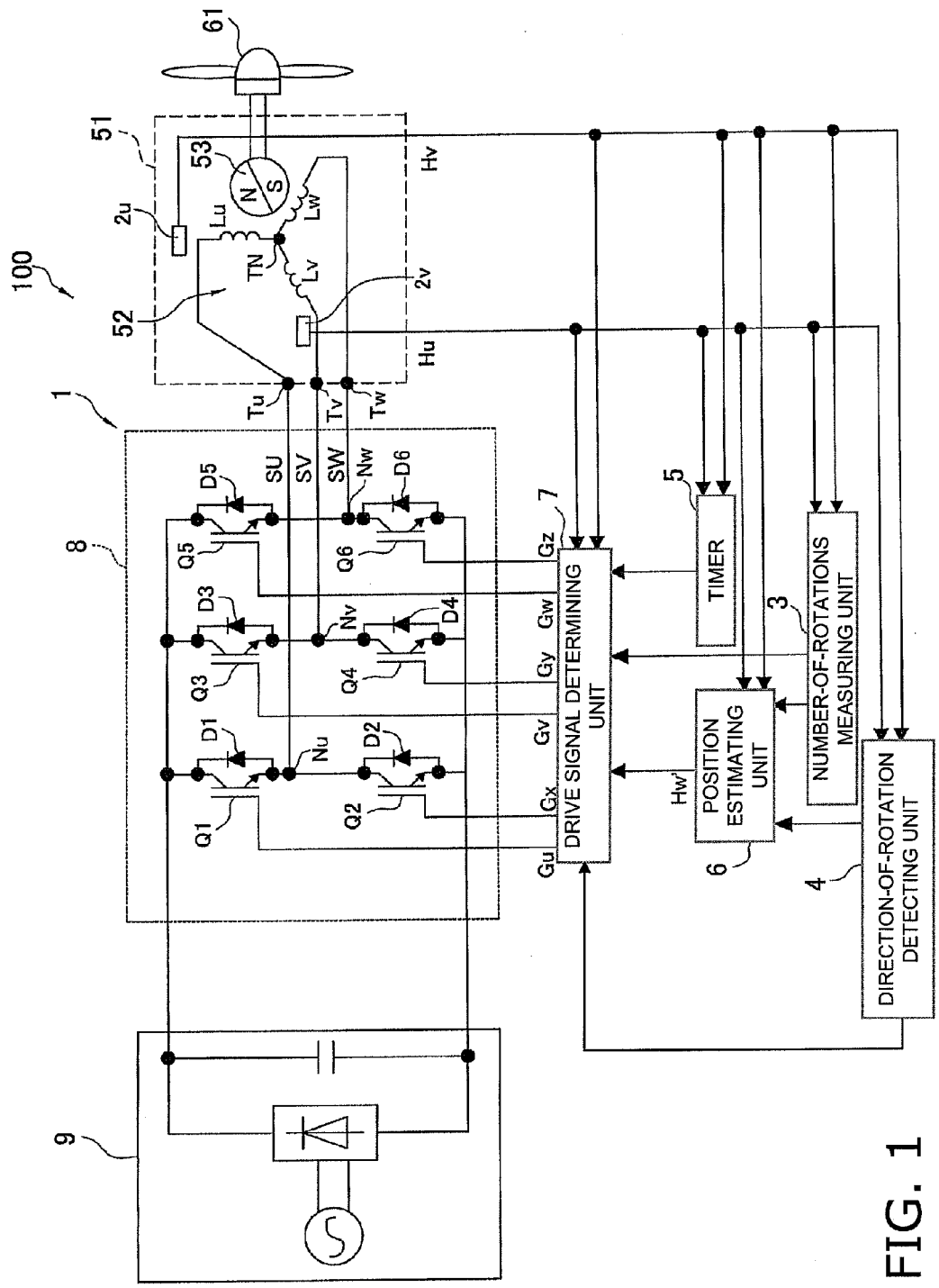
FIG. 1 is a block diagram showing the overall configuration of a motor drive control system and the internal configuration of a motor drive control device pertaining to the present embodiment.

FIG. 1 is an overall configurable diagram of a motor drive control system 100 that includes a motor 51 and a motor drive control device 1 for controlling the driving of this motor. Here, examples of types of the motor generally include a direct current motor, an alternating current motor, a stepping motor and a brushless DC motor and the like, but in the present embodiment, a brushless DC motor is used.

The brushless DC motor 51 is, for example, a fan motor used in a fan 61 in an outdoor unit of an air conditioner, and the brushless DC motor 51 is disposed with a stator 52 and a rotor 53.

The stator 52 includes drive coils Lu, Lv and Lw of a U phase, a V phase and a W phase that are star-connected. One end of the drive coil Lu of the U phase is connected to a drive coil terminal TU of the U phase, one end of the drive coil Lv of the V phase is connected to a drive coil terminal TV of the V phase, one end of the drive coil Lw of the W phase is connected to a drive coil terminal TW of the W phase, and the other ends of the drive coils Lu, Lv and Lw are all connected to a terminal TN. These 3-phase drive coils Lu, Lv and Lw generate induced voltages Vun, Vvn and Vwn corresponding to the rotating speed of the rotor 53 and the position of the rotor 53 as a result of the rotor 53 rotating.

The rotor 53 includes a permanent magnet of two poles comprising an N pole and an S pole and rotates about an axis of rotation with respect to the stator 52. The rotation of the rotor 53 is outputted to the fan 61 via an output shaft (not shown) that is on the same axial center as this axis of rotation.

(2) Configuration of Motor Drive Control Device

Next, the configuration of the motor drive control device 1 pertaining to the present embodiment will be described. The motor drive control device 1 of the present embodiment performs control corresponding to the number of rotations of the rotor 53 and is disposed with two Hall ICs $2u$ and $2v$, a number-of-rotations measuring unit 3, a direction-of-rotation detecting unit 4, a timer 5, a position estimating unit 6, a drive signal determining unit 7 and an output circuit 8 (which corresponds to a drive signal outputting unit).

The two Hall ICs $2u$ and $2v$ are disposed in positions apart from each other by an electric angle of 120 degrees. Specifically, the Hall IC $2u$ is disposed so as to correspond to the drive coil Lu, and the Hall IC $2v$ is disposed so as to correspond to the drive coil Lv. Generally, in a universal 3-phase brushless DC motor, there are three Hall ICs disposed in correspondence to each of the drive coils Lu, Lv and Lw, but in contrast, the present embodiment can be said to have a configuration where the Hall IC that is disposed in correspondence to the drive coil Lw has been removed from the three Hall ICs in this universal 3-phase brushless DC motor. Each of the Hall ICs $2u$ and $2v$ detect, on the basis of the induced voltages Vun and Vvn generated in each of the corresponding drive coils Lu and Lv, the position of the rotor 53 with respect to the stator 52. Hereinafter, signals representing the position of the rotor 53 that each of the Hall ICs $2u$ and $2v$ have detected will be called position detection signals Hu and Hv. These position detection signals Hu and Hv are outputted to the number-of-rotations measuring unit 3, the direction-of-rotation detecting unit 4, the timer 5, the position estimating unit 6 and the drive signal determining unit 7. It will be noted that the position detection signals Hu and Hv pertaining to the present embodiment are square waves representing "0" or "1". It will also be noted that, in the present embodiment, Hall ICs are employed as the components that detect the position of the rotor 53 with respect to the stator 52, but Hall elements may also be used instead of Hall ICs.

The number-of-rotations measuring unit 3 measures the number of rotations of the rotor 53. It will be noted that the measured number of rotations of the rotor 53 is inputted to the position estimating unit 6 and the drive signal determining unit 7.

The direction-of-rotation detecting unit 4 detects the direction of rotation of the rotor 53. It will be noted that the detected direction of rotation of the rotor 53 is inputted to the position estimating unit 6 and the drive signal determining unit 7.

The timer 5 starts measuring a first time at a timing when one of the position detection signals Hu and Hv that each of the Hall ICs $2u$ and $2v$ detect changes when the number of rotations of the rotor 53 is in the vicinity of "0" rpm, such as, for example, immediately after the rotor 53 has started rotating or when an external force such as wind acts in a reverse rotating direction of the fan 61 and has caused the rotor 53 inside the brushless DC motor 51 in a state where it is reversely rotating to start in a forward direction. Further, the timer 5 starts measuring a second time at a timing when the number of rotations of the rotor 53 is in the vicinity of "0" rpm and the drive signal determining unit 7 has changed energization patterns of drive signals SU, SV and SW (described later). The first and second times that have been measured in this manner are inputted to the drive signal determining unit 7.

The position estimating unit 6 estimates the position of the rotor 53 on the basis of at least one of the position detection signals Hu and Hv. For example, the position estimating unit 6 calculates the rotating speed of the rotor 53 on the basis of the time when the two position detection signals Hu and Hv change respectively and estimates the position of the rotor 53 at a place corresponding to the drive coil Lw on the basis of this rotating speed of the rotor 53. Hereinafter, a signal representing the position of the rotor 53 that has been estimated in this manner will be called a position estimation signal Hw'. The position estimation signal Hw' is outputted to the drive signal determining unit 7. Here, it will be assumed that the position estimation signal Hw' is, similar to the position detection signals Hu and Hv, a signal representing "0" or "1". It will be noted that the position estimating unit 6 pertaining to the present embodiment is configured to output the position estimation signal Hw' comprising a signal of "0" or "1" in this manner, but the position estimating unit 6 may also estimate the position (that is, the electric angle) itself of the rotor 53.

The drive signal determining unit 7 comprises a microcomputer that includes a CPU and a memory, for example, and determines drive signals SU, SV and SW for driving the 3-phase drive coils Lu, Lv and Lw depending on the number of rotations of the rotor 53. More specifically, the drive signal determining unit 7 determines, and outputs to the output circuit 8, gate signals Gu, Gx, Gv, Gy, Gw and Gz for switching ON and OFF insulated gate-type bipolar transistors Q1 to Q6 (described later) in the output circuit 8 using signal determination tables (described later) of FIG. 2 to FIG. 4. Here, the drive signals SU, SV and SW are generated as a result of each of the insulated gate-type bipolar transistors Q1 to Q6 being switched ON and OFF by the gate signals Gu, Gx, Gv, Gy, Gw and Gz. For that reason, determining the gate signals Gu, Gx, Gv, Gy, Gw and Gz corresponds to determining the drive signals SU, SV and SW. Consequently, hereinafter, in order to simplify description, the drive signal determining unit 7 will be described as determining the gate signals Gu, Gx, Gv, Gy, Gw and Gz. It will be noted that the drive signals SU, SV and SW pertaining to the present embodiment are voltages.

In the memory, there are stored control programs for the CPU to determine the gate signals Gu, Gx, Gv, Gy, Gw and Gz and signal determination tables 1 to 3 of FIG. 2 to FIG. 4. The signal determination table 1 of FIG. 2 stores, as one record, energization patterns of the drive signals SU, SV and SW and the gate signals Gu, Gx, Gv, Gy, Gw and Gz. The signal determination table 2 of FIG. 3 stores, as one record, the position detection signals Hu and Hv, the position estimation signal Hw' and the gate signals Gu, Gx, Gv, Gy, Gw and Gz. The signal determination table 3 of FIG. 4 stores, as one record, the position detection signals Hu and Hv, the gate signals Gu, Gx, Gv, Gy, Gw and Gz and energization patterns of the drive signals SU, SV and SW.

Here, the method by which the drive signal determining unit 7 determines the gate signals Gu, Gx, Gv, Gy, Gw and Gz will be divided into three cases depending on the number of rotations of the rotor 53 and briefly described.

When the number of rotations of the rotor 53 is in the vicinity of "0" rpm, the drive signal determining unit 7 monitors the first time or the second time that the timer 5 is measuring. Additionally, when this first time exceeds a first predetermined time or when the second time exceeds a second predetermined time, the drive signal determining unit 7 switches the energization pattern of the drive signals SU, SV and SW currently being outputted to another energization pattern. For example, when the energization pattern of the drive signals SU, SV and SW currently being outputted is "0", the drive signal determining unit 7 selects another energization pattern "1" and extracts, from the signal determination table 1 of FIG. 2, the gate signals Gu, Gx, Gv, Gy, Gw and Gz in this pattern "1".

When the direction of rotation of the rotor 53 is the forward direction and an force acts in the rotating direction of the fan 61 because of normal running operation or the affect of wind or the like and the number of rotations of the rotor 53 has become equal to or greater than a predetermined number of rotations, the drive signal determining unit 7 changes the energization width of each of the drive signals SU, SV and SW currently being outputted to an electric angle of 120 degrees on the basis of the position estimation signal Hw' and the position detection signals Hu and Hv. More specifically, the drive signal determining unit 7 repeats operation to apply the position estimation signal Hw' and the position detection signals Hu and Hv to the signal determination table 2 of FIG. 3 and determine the gate signals Gu, Gx, Gv, Gy, Gw and Gz. Because of this operation, the drive signals SU, SV and SW outputted from the output circuit 8 become signals for energizing the drive coils Lu, Lv and Lw 120 degrees.

Further, when the number of rotations of the rotor 53 is in the vicinity of or greater than "0" rpm and less than a predetermined number of rotations, the drive signal determining unit 7 applies the position detection signals Hu and Hv to the signal determination table 3 of FIG. 4 and determines the gate signals Gu, Gx, Gv, Gy, Gw and Gz. It will be noted that this operation will be described in detail in "(3) Control Operation when Number of Rotations of Rotor is in Vicinity of or Greater than "0" rpm and Less than Predetermined Number of Rotations".

The output circuit 8 includes the insulated gate bipolar transistors (below, simply called "transistors") Q1 and Q6 and diodes D1 to D6. The transistors Q1 and Q2, Q3 and Q4, and Q5 and Q6 are respectively connected in series between a power source line, to which a power source voltage from the power source unit 9 is supplied, and a GND line. Each of connection points NU, NV and NW between the transistors Q1 and Q2, Q3 and Q4, and Q5 and Q6 are respectively connected to the drive coil terminals TU, TV and TW of the U phase, the V phase and the W phase of the 3-phase brushless DC motor 51. The diodes D1, D3 and D5 are connected so as to short the transistors Q1, Q3 and Q5, and the diodes D2, D4 and D6 are connected so as to short the transistors Q2, Q4 and Q6. In the output circuit 8 having this configuration, the gate signals Gu, Gx, Gv, Gy, Gw and Gz outputted from the drive signal determining unit 7 are applied to gate terminals of each of the transistors Q1 to Q6, whereby the transistors Q1 to Q6 are switched ON and OFF and the drive signals SU, SV and SW are outputted to the each of drive coils Lu, Lv and Lw.

(3) Control Operation when Number of Rotations of Rotor is in Vicinity of or Greater than "0" rpm and Less than Predetermined Number of Rotations Next, operation where the motor drive control device 1 controls the driving of the brushless DC motor 51 when the number of rotations of the rotor 53 is in the vicinity of or greater than "0" rpm and less than a predetermined number of rotations, which is one characteristic of the present embodiment, will be described. It will be noted that the position detection signals Hu and Hv pertaining to the present embodiment are delayed 30 degrees and change from a zero cross point of each of the induced voltages Vun and Vvn generated in each of the drive coils Lu and Lv.

Figure 5:
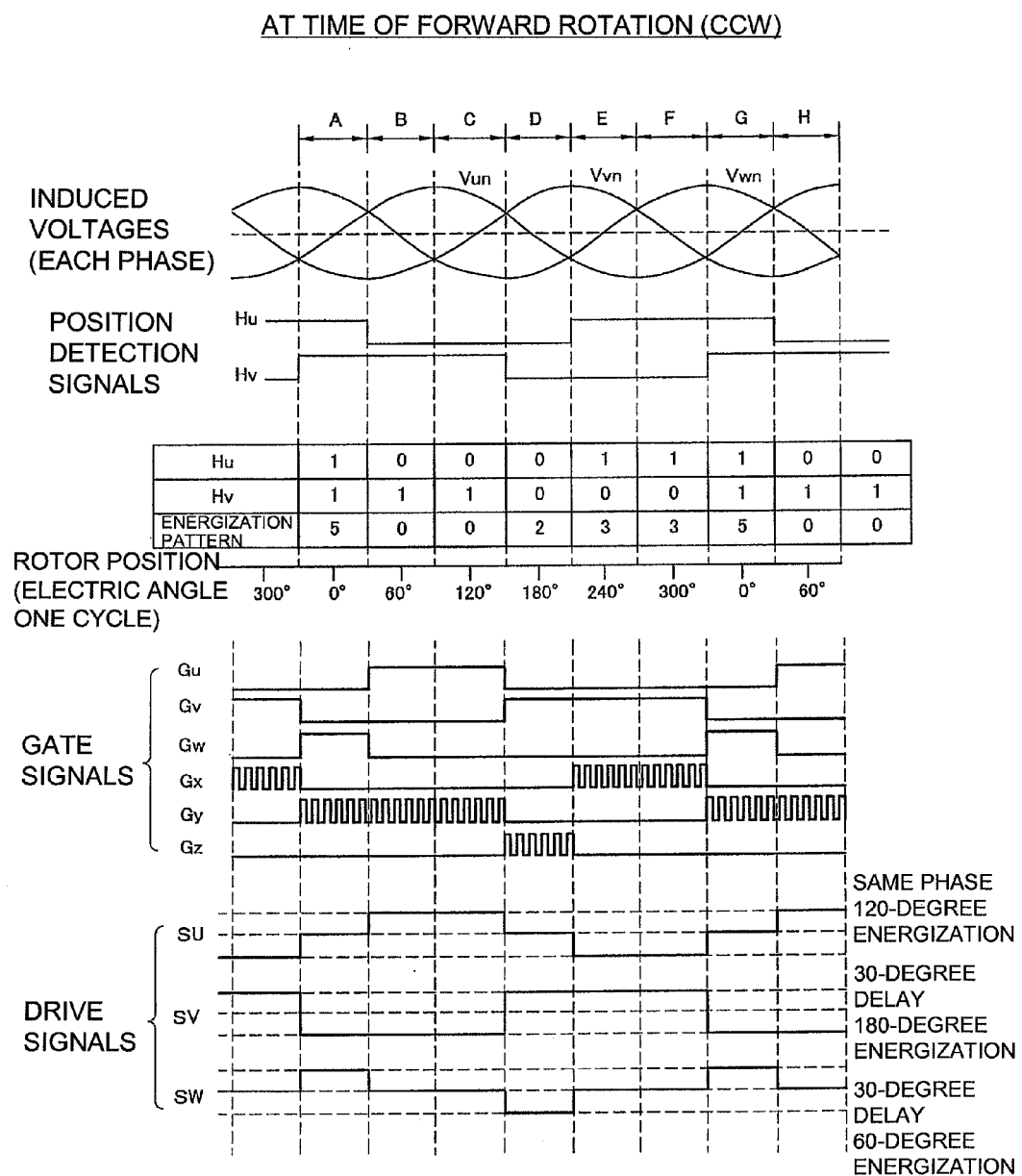
FIG. 5 is a timing chart of each of signals when, in the motor drive control system pertaining to the present embodiment, a brushless DC motor has rotated in a forward direction.

FIG. 5 is a timing chart of the induced voltages Vun, Vvn and Vwn generated in each of the drive coils Lu, Lv and Lw and other signals when the rotor 53 of the brushless DC motor 51 is rotating in the forward direction (CCW: Counter Clock-Wise). Sections A to H in FIG. 5 are sections where the angle of rotation of the rotor 53 has been sectioned by every 60 degrees, such as "330 degrees to 30 degrees" and "30 degrees to 90 degrees", when 360 degrees represents one cycle. Further, in FIG. 5, "H" represents a case where each of the gate signals Gu, Gx, Gv, Gy, Gw and Gz are "ON", and "L" represents a case where each of the gate signals Gu, Gx, Gv, Gy, Gw and Gz are "OFF".

To begin, when the angle of rotation of the rotor 53 is in section A, the Hall ICs 2u and 2v output the position detection signals Hu and Hv whose values are both "1" on the basis of each of the induced voltages Vun and Vvn. The drive signal determining unit 7 applies these position detection signals Hu and Hv to the signal determination table 3 of FIG. 4 and determines, and outputs to the gate terminals of each of the transistors Q1 to Q6 of the output circuit 8, the gate signals Gu, Gx, Gv, Gy, Gw and Gz in order as "OFF", "OFF", "OFF", "ON", "ON" and "OFF". Thus, the transistors Q4 and Q5 are switched ON, and the remaining transistors Q1 to Q3 and Q6 are switched OFF, so the drive signals SU, SV and SW become as shown in section A of FIG. 5, and the current flows from the drive coil Lw to the drive coil Lv. Thus, electromagnetic force corresponding to the current with which the drive coils have been energized is generated in each of the drive coils Lu, Lv and Lw, and the rotor 53 rotates in the forward direction.

Next, when the angle of rotation of the rotor 53 reaches section B, the Hall ICs 2u and 2v output the position detection signals Hu and Hv whose values are "0" and "1", respectively. The drive signal determining unit 7 applies these position detection signals Hu and Hv to the signal determination table 3 of FIG. 4 and determines, and outputs to the gate terminals of each of the transistors Q1 to Q6 of the output circuit 8, the gate signals Gu, Gx, Gv, Gy, Gw and Gz in order as "ON", "OFF", "OFF", "ON", "OFF" and "OFF". Thus, the transistors Q1 and Q4 are switched ON, and the remaining transistors Q2, Q3, Q5 and Q6 are switched OFF, so the drive signals SU, SV and SW become as shown in section B of FIG. 5, and the current flows from the drive coil Lu to the drive coil Lv. In this manner, when the path of the current flowing in each of the 3-phase drive coils Lu, Lv and Lw changes in accordance with the angle of rotation of the rotor switching from section A to section B, the electromagnetic force generated in each of the drive coils Lu, Lv and Lw changes, and the rotor 53 rotates further in the forward direction.

In regard to the other sections C to H, the motor drive control device 1 similarly controls the driving of the brushless DC motor 51.

As mentioned above, when the motor drive control device 1 has controlled the driving of the brushless DC motor 51, as shown in FIG. 5, the energization widths of each of the drive signals SU, SV and SW outputted to each of the drive coils Lu, Lv and Lw become 120 degrees, 180 degrees and 60 degrees in order. Further, the drive signal SU becomes the same phase as the induced voltage Vun generated in the drive coil Lu to which this drive signal SU is inputted. On the other hand, the phases of the drive signals SV and SW are delayed by 30 degrees with respect to the induced voltages Vvn and Vwn generated in the drive coils Lv and Lw to which these drive signals SV and SW are respectively inputted.

It will be noted that, although the energization widths of each of the drive signals SU, SV and SW and the phases of the position detection signals Hu and Hv and the like are simply described as "120 degrees" and the like, sometimes these numerical values slightly deviate due to variations in the positions where the Hall ICs 2u and 2v are attached or the like.

(4) Overall Control Operation of Motor Drive Control Device

Figure 6:
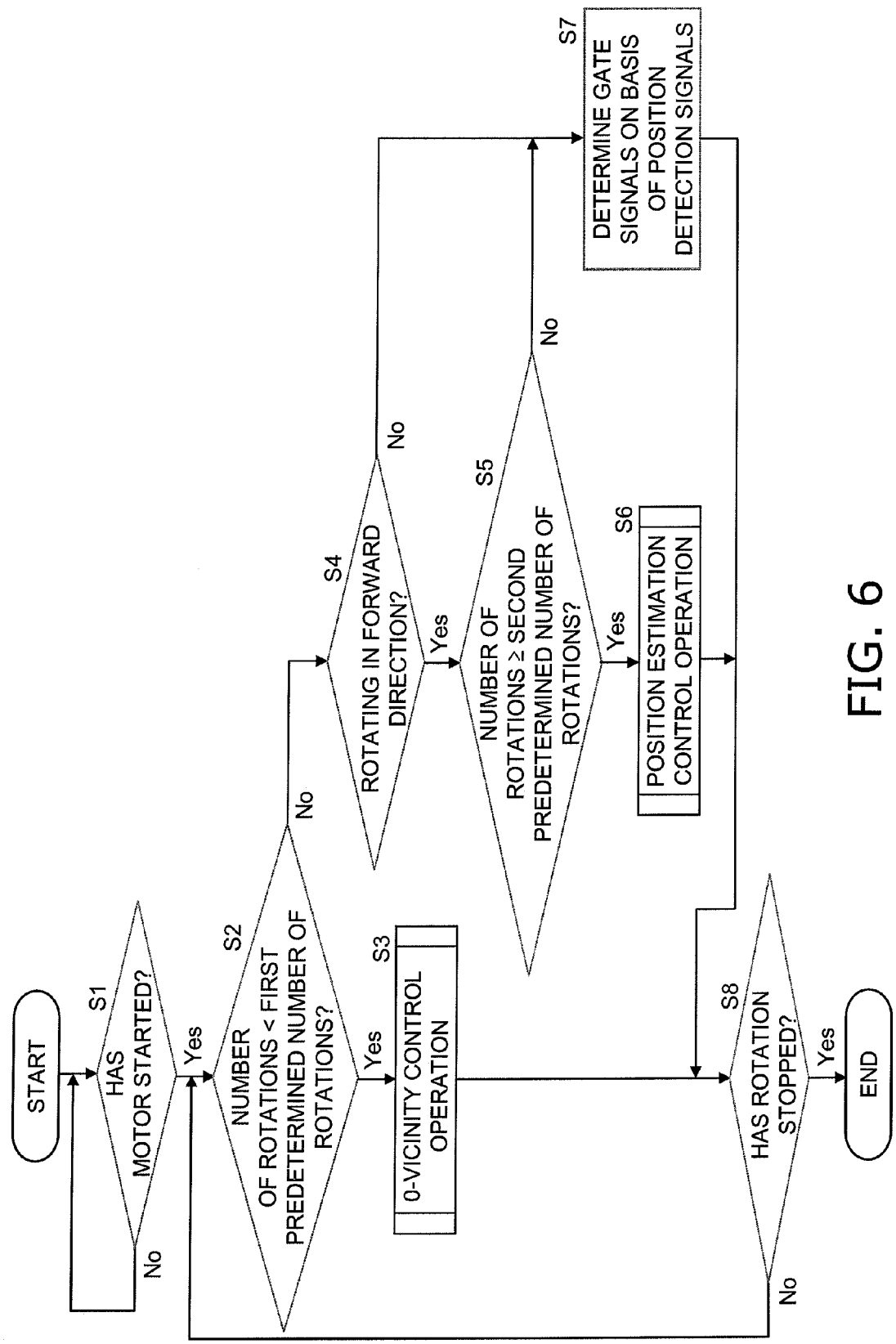
FIG. 6 is a flowchart showing the overall flow of control operation that the motor drive control device pertaining to the present embodiment performs.

FIG. 6 is a flowchart showing the overall flow of control operation that the motor drive control device 1 performs. It will be noted that, hereinafter, "first predetermined number of rotations" is a predetermined number of rotations for judging whether or not the number of rotations is in the vicinity of "0" rpm and that "second predetermined number of rotations" is a predetermined number of rotations that is sufficiently higher than the first predetermined number of rotations (first predetermined number of rotations<second predetermined number of rotations). For example, the first predetermined number of rotations is about several tens of rpm, and the second predetermined number of rotations is about a hundred and several tens of rpm.

Step S1: When the brushless DC motor 51 starts, the number-of-rotations measuring unit 3 begins measuring the number of rotations of the rotor 53 in the brushless DC motor 51. Further, the position estimating unit 6 calculates the rotating speed of the rotor 53 on the basis of the time when the two position detection signals Hu and Hv change respectively and starts estimating the position of the rotor 53 on the basis of this rotating speed of the rotor 53.

Steps S2 and S3: When the number of rotations of the rotor 53 is lower than the first predetermined number of rotations (S2), the motor drive control device 1 judges that the number of rotations of the rotor 53 is in the vicinity of "0" rpm and performs O-vicinity control in regard to the brushless DC motor 51 (S3). This control operation will be described in detail in "(4-1) O-Vicinity Control Operation".

Steps S4 to S6: When the direction of rotation of the rotor 53 is the forward direction (S4) and the number of rotations is higher than the second predetermined number of rotations (S5), the motor drive control device 1 performs position estimation control in regard to the brushless DC motor 51 (S6). This control operation will be described in detail in "(4-2) Position Estimation Control Operation".

Step S7: When the number of rotations of the rotor 53 is higher than the first predetermined number of rotations and lower than the second predetermined number of rotations or when the number of rotations of the rotor 53 is higher than the first predetermined number of rotations and the direction of rotation of the rotor 53 is the reverse direction, the motor drive control device 1 performs operation that has been described in "(3) Control Operation when Number of Rotations of Rotor is in Vicinity of or Greater than "0" rpm and Less than Predetermined Number of Rotations". That is, the drive signal determining unit 7 determines the gate signals Gu, Gx, Gv, Gy, Gw and Gz on the basis of the position detection signals Hu and Hv that the Hall ICs 2u and 2v detect. Each of the transistors Q1 to Q6 of the output circuit 8 are switched ON and OFF by the gate signals Gu, Gx, Gv, Gy, Gw and Gz that have been determined in this manner, and the drive signals SU, SV and SW are outputted to each of the drive coils Lu, Lv and Lw inside the brushless DC motor 51.

Step S8: The motor drive control device 1 repeats operation of steps S2 to S7 until the brushless DC motor 51 stops rotating.

(4-1) 0-Vicinity Control Operation

Figure 7:
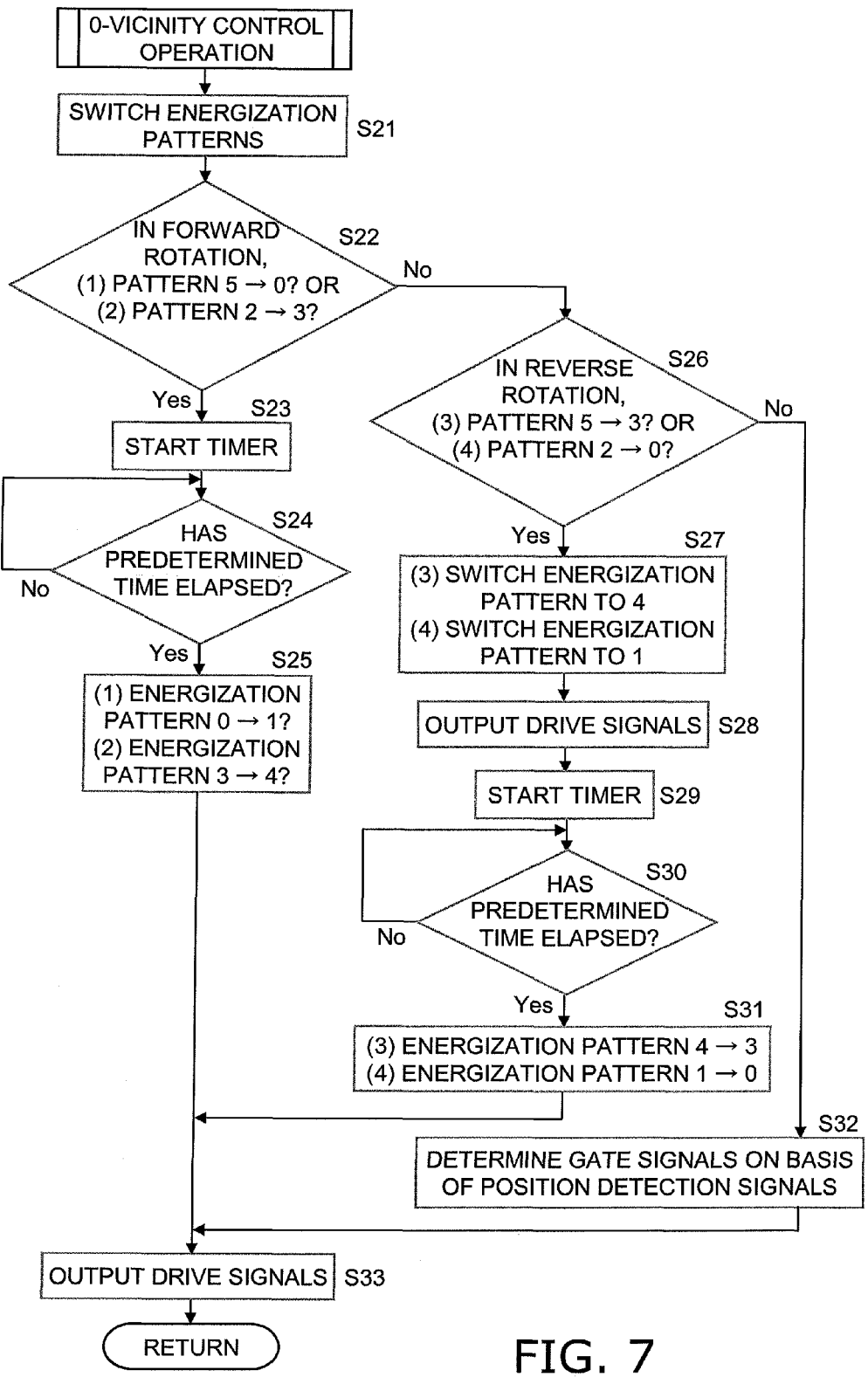
FIG. 7 is a flowchart showing the flow of O-vicinity control operation of the motor drive control device pertaining to the present embodiment.

FIG. 7 is a flowchart showing the flow of O-vicinity control operation.

Steps S21 to S23: When the energization pattern of the drive signals SU, SV and SW switches (S21), the direction-of-rotation detecting unit 4 detects the direction of rotation of the rotor 53. At this time, if the direction of rotation of the rotor 53 is the forward direction and the energization pattern of the drive signals SU, SV and SW has switched from "5" to "0" or from "2" to "3" (S22), the timer 5 starts measuring the first time (S23).

Steps S24 and S25: When the first time has elapsed beyond the first predetermined time (S24), the drive signal determining unit 7 determines the next energization pattern of the drive signals SU, SV and SW on the basis of the energization pattern of the drive signals SU, SV and SW currently being outputted. Specifically, when the current energization pattern of the drive signals SU, SV and SW is "0", the drive signal determining unit 7 switches this to an energization pattern of "1", and when the energization pattern is "3", the drive signal determining unit 7 switches this to an energization pattern of "4" (S25).

Steps S26 to S29: In step S21, if the direction of rotation of the rotor 53 is the reverse direction and the energization pattern of the drive signals SU, SV and SW has switched from "5" to "3" or from "2" to "0" (S26), when the energization pattern of the drive signals SU, SV and SW currently being outputted is "3", the drive signal determining unit 7 switches this to an energization pattern of "4", and when the current energization pattern of the drive signals SU, SV and SW is "0", the drive signal determining unit 7 switches this to an energization pattern of "1" (S27). Next, the drive signal determining unit 7 applies the new energization pattern to the signal determination table 1 of FIG. 2 and determines, and outputs to the output circuit 8, the gate signals Gu, Gx, Gv, Gy, Gw and Gz. The output circuit 8 outputs the drive signals SU, SV and SW to each of the drive coils Lu, Lv and Lw (S28). Additionally, the timer 5 starts measuring the second time (S29).

Steps S30 and S31: When the second time has elapsed beyond the second predetermined time (S30), when the energization pattern of the drive signals SU, SV and SW currently being outputted is "4", the drive signal determining unit 7 switches this to an energization pattern of "3", and when the current energization pattern of the drive signals SU, SV and SW is "1", the drive signal determining unit 7 switches this to an energization pattern of "0" (S31).

Step S32: In step S21, when the energization pattern of the drive signals SU, SV and SW has switched other than steps S22 and S26, the drive signal determining unit 7 applies the position detection signals Hu and Hv of the Hall ICs 2u and 2v to the signal determination table 3 of FIG. 4 and determines, and outputs to the output circuit 8, the gate signals Gu, Gx, Gv, Gy, Gw and Gz. It will be noted that specific operation of the drive signal determining unit 7 at this time is that same as in "(3) Control Operation when Number of Rotations of Rotor is in Vicinity of or Greater than "0" rpm and Less than Predetermined Number of Rotations".

Step S33: The output circuit 8 outputs, to each of the drive coils Lu, Lv and Lw inside the brushless DC motor 51, the drive signals SU, SV and SW based on the energization pattern of the drive signals SU, SV and SW determined in steps S25 and S31 and the drive signals SU, SV and SW corresponding to the gate signals Gu, Gx, Gv, Gy, Gw and Gz outputted in step S32.

(4-2) Position Estimation Control Operation

Figure 8:
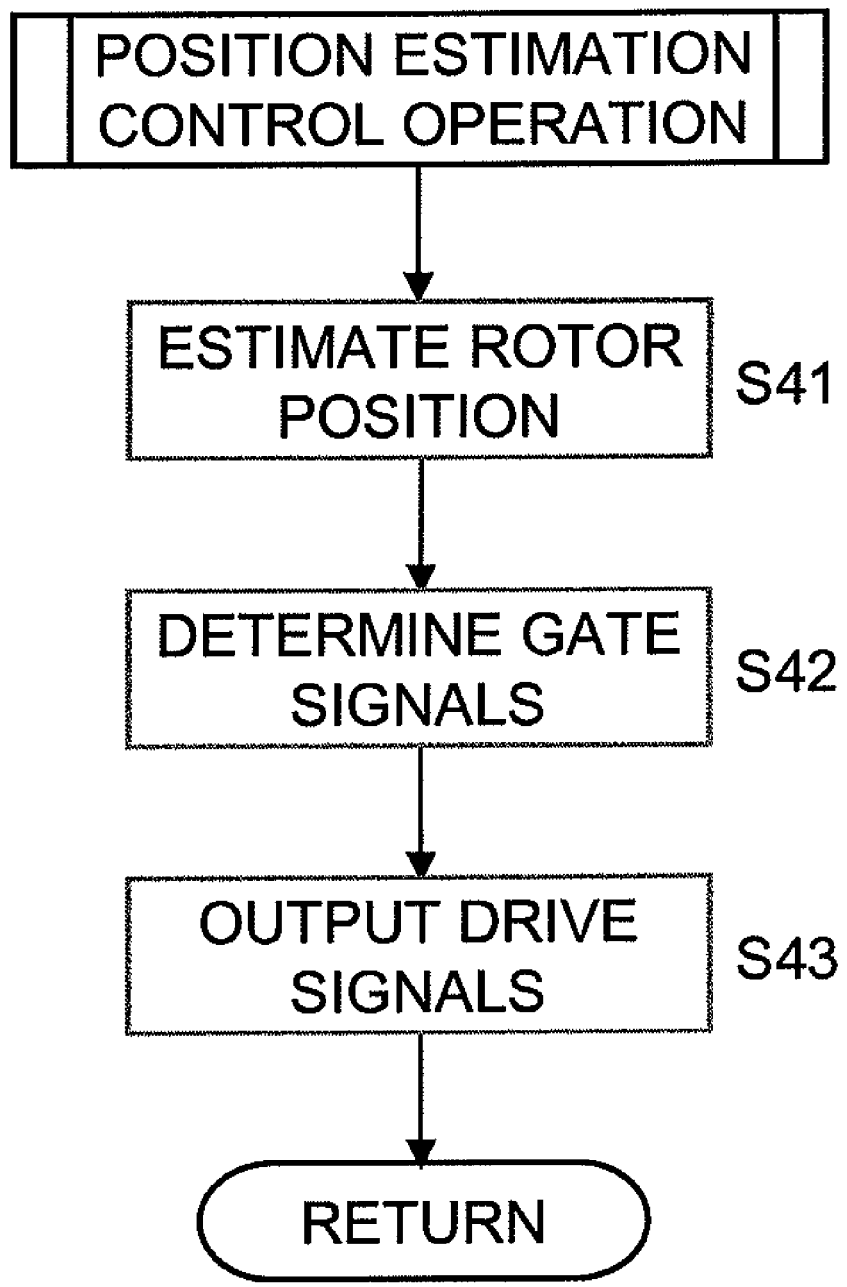
FIG. 8 is a flowchart showing the flow of position estimation control operation of the motor drive control device pertaining to the present embodiment.

FIG. 8 is a flowchart showing the flow of position estimation control operation.

Steps S41 and S42: The drive signal determining unit 7 applies, to the signal determination table 2 of FIG. 3, the position estimation signal Hw' (S41) that is being outputted by the position estimating unit 6 and the position detection signals Hu and Hv that have been detected by the Hall ICs 2u and 2v, and determines, and outputs to the output circuit 8, the gate signals Gu, Gx, Gv, Gy, Gw and Gz (S42).

Step S43: The output circuit 8 outputs, to each of the drive coils Lu, Lv and Lw of the brushless DC motor 51, the drive signals SU, SV and SW corresponding to the gate signals Gu, Gx, Gv, Gy, Gw and Gz outputted in step S42. The motor drive control device 1 repeats operation of steps S41 to S43, whereby the energization width of each of the drive signals SU, SV and SW becomes substantially 120 degrees, and the rotor 53 rotates in 120-degree energization.

(5) Effects

This motor drive control device 1 determines, and outputs to each of the drive coils Lu, Lv and Lw, the drive signals SU, SV and SW by determining the gate signals Gu, Gx, Gv, Gy, Gw and Gz from only the position detection signals Hu and Hv of the two Hall ICs 2u and 2v. When this happens, the current energizes each of the drive coils Lu, Lv and Lw in an orientation corresponding to the drive signals SU, SV and SW at those times, and the brushless DC motor 51 is driven. In this manner, the motor drive control device 1 performs drive control of the brushless DC motor 51 because of the configuration disposed with the two Hall ICs 2u and 2v, but the motor drive control device 1 does not require a unique circuit or the like for drive control and can control the driving of the brushless DC motor 51 using a circuit or the like for drive control in a case where the device is disposed with three Hall ICs. Consequently, a reduction in costs can be realized.

Further, when the number of rotations of the rotor 53 reaches the vicinity of "0" rpm, such as, for example, when an external force such as wind acts in the reverse rotating direction of the fan 61 and causes the brushless DC motor 51 in a state where it is reversely rotating to start in the forward direction, the motor drive control device 1 starts measuring time from when one of the two position detection signals Hu and Hv changes, and the motor drive control device 1 changes the drive signals SU, SV and SW currently being outputted after the elapse of a predetermined time. Thus, the path of the current flowing in each of the 3-phase drive coils Lu, Lv and Lw changes, and the electromagnetic force generated in the drive coils Lu, Lv and Lw changes, so the rotor 53 rotates, and the number of rotations of the rotor 53 becomes no longer "0" rpm. Consequently, the motor drive control device 1 becomes able to grasp and suitably control the accurate position of the rotor 53. For that reason, the reversely rotating brushless DC motor 51 can stably start in the forward direction without an excess load being applied thereto, and the motor drive control device 1 can prevent a drop in the reliability of the motor and the like and prevent the lifespan of the motor and the motor drive control device 1 itself from becoming shorter. In particular, this control can, as shown in FIG. 5, achieve effects in a case where the phases of the position detection signals Hu and Hv are shifted 30 degrees with respect to each of the induced voltages Vun and Vvn.

Figure 9:
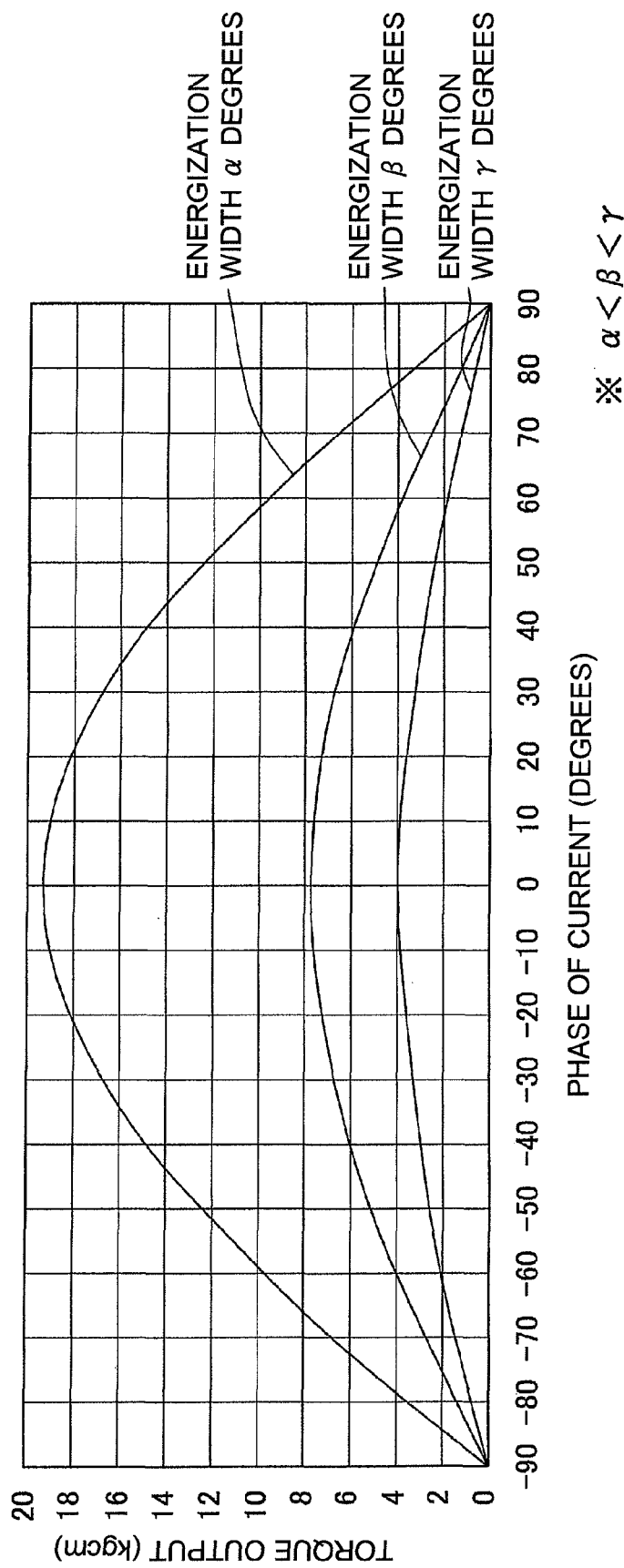
FIG. 9 is a diagram showing the relationship between the phase of a current and the torque output of the brushless DC motor.

Moreover, when the brushless DC motor 51 is rotating in the forward direction and the number of rotations of the brushless DC motor 51 has become equal to or greater than a predetermined number of rotations, the motor drive control device 1 switches, to 120-degree energization, all of the three drive signals SU, SV and SW on the basis of the position estimation signal Hw' representing the position of the rotor 53 that has been estimated by the position estimating unit 6 in addition to the position detection signals Hu and Hv of the two Hall ICs 2u and 2v. Here, generally, a relationship such as shown in FIG. 9 is established between the phase and current amount of the current with which each of the drive coils Lu, Lv and Lw are energized and the torque output of the motor, and in particular the torque output of the motor becomes larger the larger that the current with which the drive coils are energized is. Further, when the drive signal determining unit 7 is performing PWM control to output an output voltage whose duty is constant, the same relationship is established in response to the energization width. However, in the present embodiment, the torque output of the brushless DC motor 51 becomes substantially constant because the motor drive control device 1 switches all three of the drive signals SU, SV and SW in this manner to 120-degree energization. Consequently, the ripple of the torque output can be made small, and noise and vibration that arise because of this ripple of the torque output can be controlled. It will be noted that this control method is effective when one wishes to control the amount of current energizing the brushless DC motor 51 for reasons such as the number of rotations of the brushless DC motor 51 is high or the load is large because of the affect of a strong wind, for example, blowing in the direction of rotation of the fan 61.

Other Embodiments

An embodiment of the present invention has been described above, but the present invention is not limited to the preceding embodiment and is capable of being variously altered in a range that does not depart from the gist of the invention.

Figure 10:
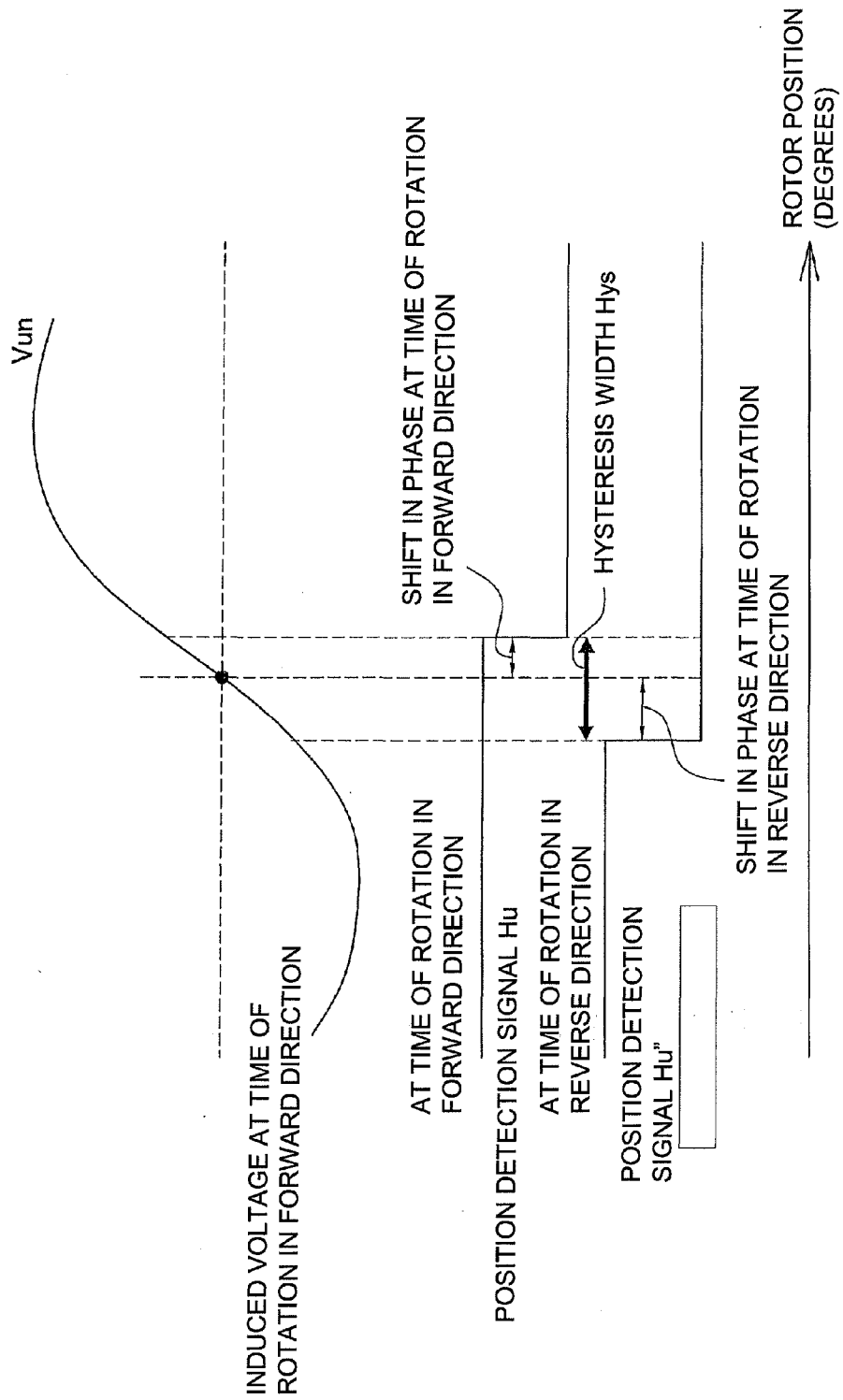
FIG. 10 is a diagram for describing hysteresis characteristics of Hall ICs.

(a) In the preceding embodiment, the Hall ICs 2u and 2v have so-called hysteresis characteristics whose thresholds that detect the position of the rotor 53 differ depending on the direction of rotation of the rotor 53. Consequently, depending on the disposition of the Hall ICs 2u and 2v, for example, as shown in FIG. 10, sometimes the shift in the phase of the position detection signal Hu with respect to the induced voltage Vun when the rotor 53 has rotated in the forward direction differs from the shift in the phase of a position detection signal Hu" with respect to the induced voltage Vun when the rotor 53 has rotated in the reverse direction. When the shifts in the phases in each of the directions of rotation are added together, they become a hysteresis width Hys that the Hall ICs 2u and 2v have. In this manner, when the shifts in the phases of the position detection signals Hu and Hu" differ depending on the direction of rotation of the rotor 53, the drive signals SU, SV and SW that are determined by the position detection signal also end up being affected. Consequently, for example, the phase of the drive signal SU with respect to the induced voltage Vun ends up differing by the amount with which the phases of the position detection signals are shifted between when the rotor 53 is rotating in the forward direction and when the rotor 53 is rotating in the reverse direction. When this happens, as will be understood from FIG. 9 also, the output torque of the brushless DC motor 51 ends up differing depending on the direction of rotation of the rotor 53.

Figure 11:
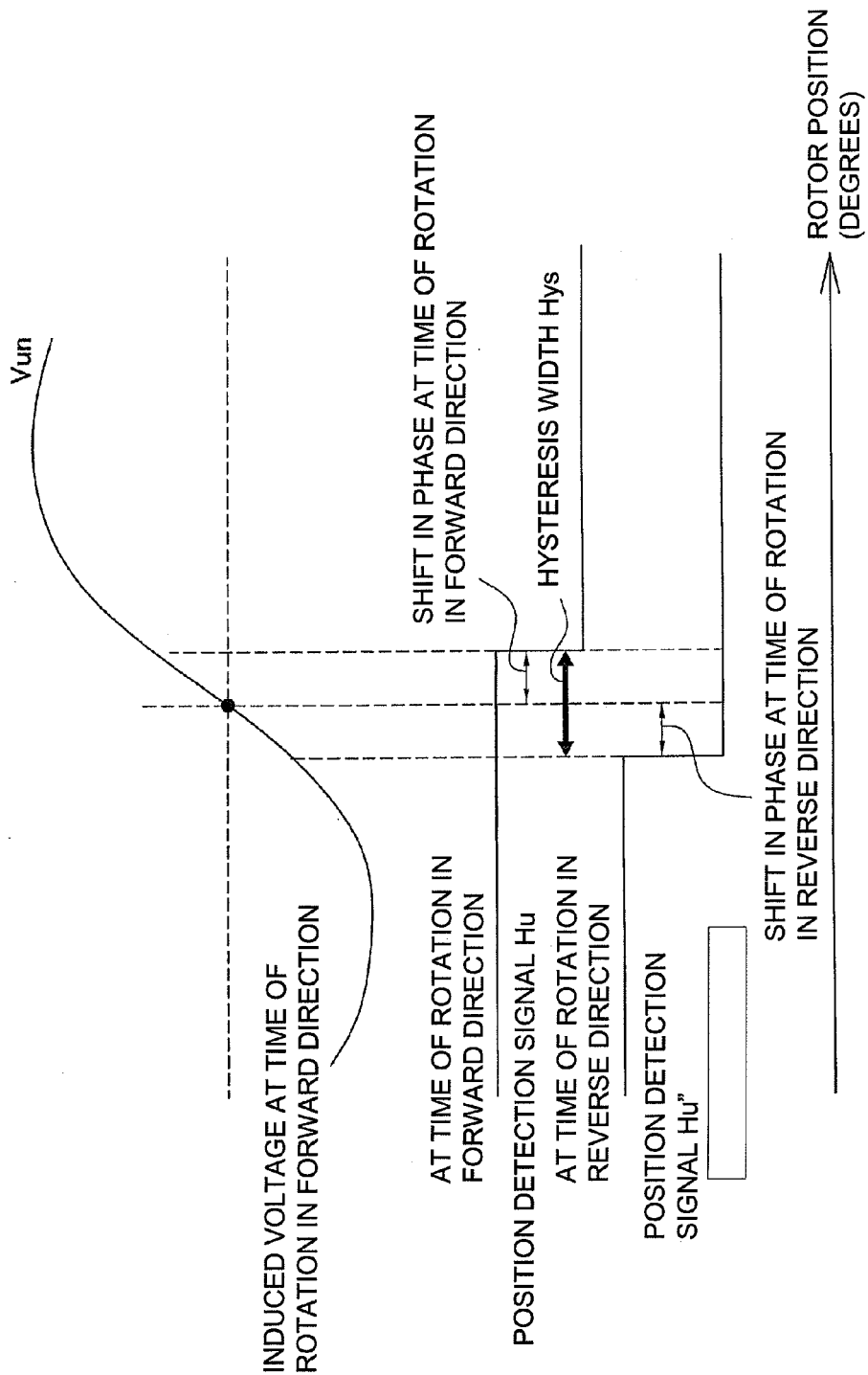
FIG. 11 is a diagram showing an induced voltage and position detection signals when the disposition of the Hall ICs has been adjusted on the basis of hysteresis characteristics in another embodiment (a).

Thus, the positions where the Hall ICs 2u and 2v are disposed may be finely adjusted on the basis of this hysteresis width Hys. Specifically, the Hall ICs 2u and 2v are disposed such that the shift in the phase of the position detection signal Hu at the time when the rotor 53 is rotating in the forward direction and the shift in the phase of the position detection signal Hu" at the time when the rotor 53 is rotating in the reverse direction become substantially equivalent to each other (FIG. 11). Thus, substantially the same output torque becomes obtained regardless of the direction of rotation of the rotor 53. Thus, fluctuations in the torque when the direction of rotation of the rotor 53 has changed disappear, and the brushless DC motor 51 can perform stable operation where there is no excessive current or abnormal sound or the like.

(b) In the preceding embodiment, when the motor drive control device 1 controls the driving of the brushless DC motor 51 when the number of rotations of the rotor 53 is in the vicinity of or greater than "0" rpm and less than a predetermined number of rotations, as shown in FIG. 5, the drive signal SU has the same phase as the induced voltage Vun generated in the drive coil Lu, but a phase difference of 30 degrees each arises in the drive signals SV and SW with respect to the induced voltages Vvn and Vwn generated in the drive coil Lu. In this manner, when a phase difference arises between the drive signals SV and SW and the induced voltages Vvn and Vwn generated in the drive coils Lv and Lw corresponding to these, as shown in FIG. 9, the torque output of the motor ends up becoming smaller by an amount corresponding to this phase difference. In particular, in the preceding embodiment, a phase difference arises in two phases of the three phases, so the torque output of the motor becomes smaller by an amount corresponding to the phase difference of two phases. Thus, in order to raise the torque output of the motor, the disposition of the two Hall ICs 2u and 2v, for example, may be adjusted such that the drive signals SV and SW and the induced voltages Vvn and Vwn become the same phases.

Figure 12:
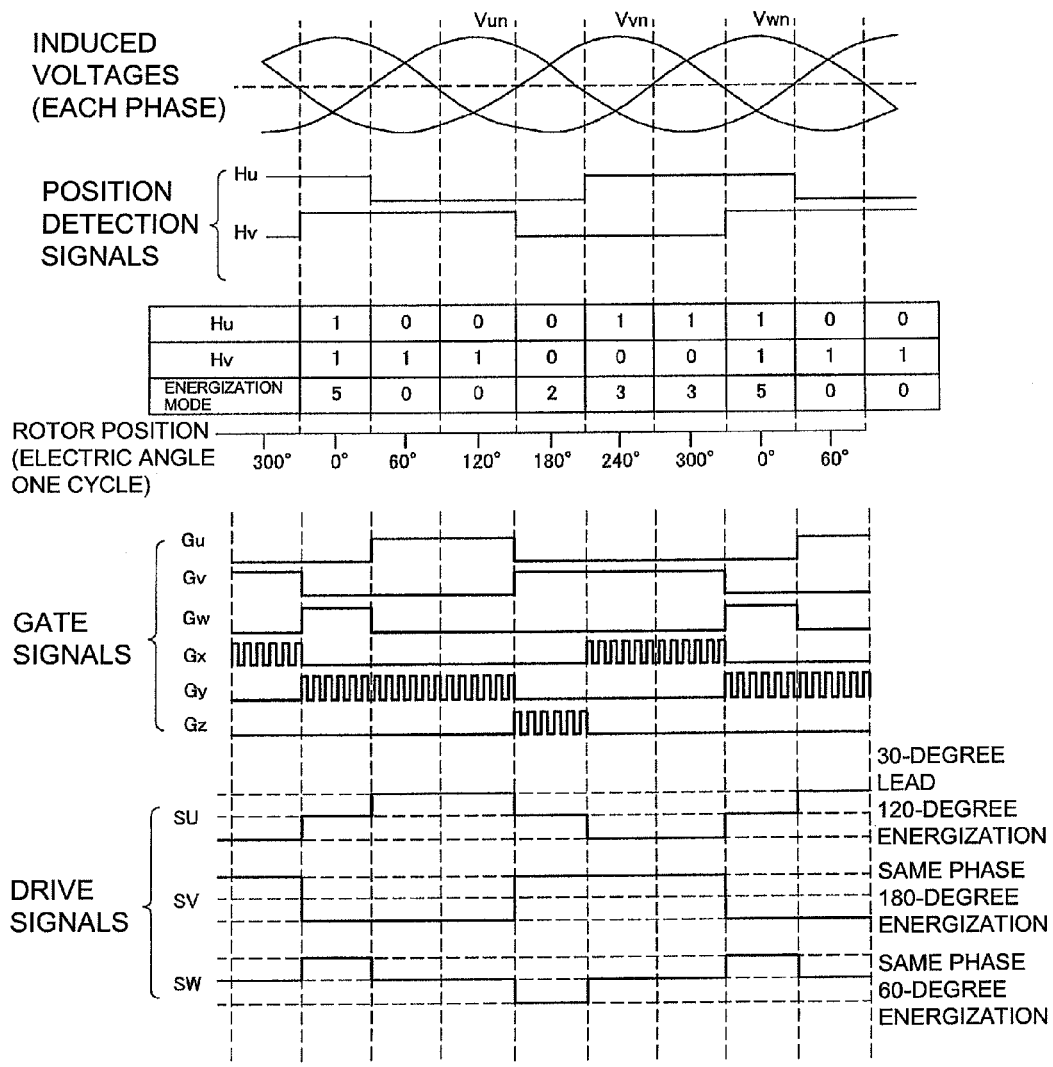
FIG. 12 is a timing chart of each of signals when, in a motor drive control system pertaining to another embodiment (b), the brushless DC motor has rotated in a forward direction.

FIG. 12 is a timing chart of the induced voltages Vun, Vvn and Vwn and signals when the disposition of the two Hall ICs 2u and 2v has been adjusted such that the drive signals SV and SW and the induced voltages Vvn and Vwn become the same phases. Here, in FIG. 12, the positions of the Hall ICs 2u and 2v have been adjusted on the basis of a phase difference of 30 degrees between the drive signals SV and SW and the induced voltages Vvn and Vwn arising in the case of FIG. 5.

In FIG. 12, the timing when the position detection signals Hu and Hv change on the basis of the induced voltages Vun and Vvn differs by about 30 degrees with respect to the timing when the position detection signals Hu and Hv change in FIG. 5 pertaining to the preceding embodiment. More specifically, whereas in FIG. 5 the induced voltages Vun and Vvn had shifted 30 degrees from the zero cross point and the position detection signals Hu and Hv had changed, the position detection signals Hu and Hv of FIG. 12 change at the zero cross point of each of the induced voltages Vun and Vvn. In other words, the position detection signals Hu and Hv of FIG. 12 are substantially the same phase as each of the induced voltages Vun and Vvn. When this happens, in FIG. 12, the phase of the drive signal SU whose energization width is 120 degrees leads 30 degrees with respect to the induced voltage Vun, but the drive signals SV and SW whose energization widths are 60 degrees and 180 degrees become the same phases as the induced voltages Vvn and Vwn.

In this manner, by adjusting the disposition of the Hall ICs 2u and 2v by an amount corresponding to a phase difference of 30 degrees between the drive signals SV and SW and the induced voltages Vvn and Vwn pertaining to FIG. 5, the only signal of the 3-phase drive signals SU, SV and SW whose phase is shifted from the induced voltages Vun, Vvn and Vwn is the drive signal SU that is 120-degree energization. In particular, of the 3 phases, the drive signal SW of 60-degree energization that outputs the least torque becomes the same phase as the induced voltage Vwn, so the minimum value of the torque output becomes higher in comparison to the case of FIG. 5 of the preceding embodiment. Consequently, the torque ripple also becomes small.

It will be noted that, similar to the preceding embodiment, although the energization widths of each of the drive signals SU, SV and SW and the phases of the position detection signals Hu and Hv and the like described here are simply described as "120 degrees" and the like, sometimes these numerical values slightly deviate due to variations in the positions where the Hall ICs are attached or the like.

(c) In the preceding embodiment, a case has been described where insulated gate-type bipolar transistors were used as the output circuit 8, but the output circuit is not limited to this. The output circuit may also have a configuration using, for example, MOS transistors or the like, instead of insulated gate-type bipolar transistors.

(d) In the preceding embodiment, a case has been described where the motor drive control device 1 was disposed with the direction-of-rotation detecting unit 3 for detecting the direction of rotation of the rotor 53, but the motor drive control device 1 is not limited to this. When the motor drive device is used to drive a motor that does not reversely rotate, for example, a direction-of-rotation detecting unit does not have to be disposed.

(e) In the preceding embodiment, a case has been taken as an example and described where the motor drive control device 1 drives the fan 6 motor in an outdoor unit of an air conditioner, but the motor drive control device is not limited to this. The motor drive control device 1 pertaining to the present invention can also be applied to a case where it drives a fan-use motor.

INDUSTRIAL APPLICABILITY

The motor drive control device pertaining to the present invention can be used as a device for controlling the driving of a motor for a fan or a brushless motor used as a rotation drive source for a compressor and a fan and the like inside an air conditioner, for example.

What is claimed is:

1. A motor drive control device configured to control driving of a brushless motor that includes a stator having 3-phase drive coils and a rotor having plural magnetic poles, the motor drive control device comprising:
    only two position detecting units disposed in positions spaced apart from each other by an electric angle of substantially 120 degrees, the position detecting units being configured to output position detection signals representing a position of the rotor with respect to the stator;
    a drive signal determining unit configured to determine drive signals for driving the 3-phase drive coils based on the position detection signals that each of the two position detecting units have outputted; and
    a drive signal outputting unit configured to generate and output the drive signals that have been determined by the drive signal determining unit to the 3-phase drive coils.

2. The motor drive control device according to claim 1, wherein
    the drive signal determining unit is further configured to determine first, second and third the drive signals such that first, second and third energization widths for first, second and third drive coils of the 3-phase drive coils become electric angles of substantially 120 degrees, substantially 180 degrees and substantially 60 degrees, respectively.

3. The motor drive control device according to claim 2, wherein
    the drive signal determining unit is further configured to determine the first drive signal such that the first energization width has a phase substantially the same as an induced voltage generated in the first drive coil into which this first drive signal is inputted.

4. The motor drive control device according to claim 3, wherein
    phases of the position detection signals are shifted by a predetermined first angle with respect to induced voltages generated in the first and second drive coils corresponding to the position detecting units.

5. The motor drive control device according to claim 4, wherein
    the predetermined first angle is substantially 30 degrees.

6. The motor drive control device according to claim 2, wherein
    the drive signal determining unit is further configured to determine the second and third drive signals such that the second and third energization widths have phases substantially the same as induced voltages generated in the second and third drive coils into which these second and third drive signals are inputted, respectively.

7. The motor drive control device according to claim 6, wherein
    the position detection signals phases substantially the same as the induced voltages generated in the first and second drive coils corresponding to the position detecting units.

8. The motor drive control device according to claim 1, wherein
    each of the two position detecting units have hysteresis characteristics with thresholds for detecting the position of the rotor that differ depending on a direction of rotation of the rotor, and
    the positions where the position detecting units are disposed are adjusted based on the hysteresis characteristics.

9. The motor drive control device according to claim 8, wherein
    each of the two position detecting units are disposed such that shifts in phases of the position detection signals with respect to induced voltages generated in the 3-phase drive coils corresponding to the position detecting units become substantially the same even when the direction of rotation of the rotor changes.

10. The motor drive control device according to claim 1, further comprising
    a time measuring unit configured to start measuring a first time when one of the two position detection signals changes, wherein
    the position detecting units are further configured such that the position detection signals are square waves, and
    the drive signal determining unit is further configured to change the drive signals currently being outputted when the first time has become equal to or greater than a first predetermined time.

11. The motor drive control device according to claim 10, wherein
    the time measuring unit is further configured to start measuring a second time when the drive signal determining unit has changed the drive signals, and
    the drive signal determining unit is further configured to change the drive signals when the second time has become equal to or greater than a second predetermined time.

12. The motor drive control device according to claim 1, further comprising
    a number-of-rotations measuring unit configured to measure a number of rotations of the rotor; and
    a position estimating unit configured to estimate position of the rotor based on at least one of the position detection signals, wherein
    the drive signal determining unit is further configured to change energization widths of the drive signals to an electric angle of a predetermined second angle based on the position of the rotor that has been estimated when the rotor is rotating in a forward direction and the number of rotations is equal to or greater than a predetermined number of rotations.

13. The motor drive control device according to claim 12, wherein
    the predetermined second angle is substantially 120 degrees.

14. The motor drive control device according to claim 12, further comprising
    a direction-of-rotation detecting unit configured to detect a direction of rotation of the rotor.

15. A motor drive control system comprising:
a brushless motor including
- a stator having 3-phase drive coils, and
- a rotor having plural magnetic poles; and a motor drive control device configured to drive the brushless motor, the motor drive control device including
- only two position detecting units disposed in positions spaced apart from each other by an electric angle of substantially 120 degrees, the position detecting units being configured to output position detection signals representing a position of the rotor with respect to the stator,
- a drive signal determining unit configured to determine drive signals for driving the 3-phase drive coils based on the position detection signals that each of the two position detecting units have outputted, and
- a drive signal outputting unit configured to generate and output the drive signals that have been determined by the drive signal determining unit to the 3-phase drive coils.

16. The motor drive control system according to claim 15, wherein
the brushless motor is a fan-use motor.

17. The motor drive control system of claim 16, wherein
the brushless motor is an outdoor unit fan motor of an air conditioner.

* * * * *